(12) United States Patent
Bartz et al.

(10) Patent No.: US 7,080,327 B1
(45) Date of Patent: Jul. 18, 2006

(54) MULTI-LEVEL QUICK CLICK ICON HIERARCHY AND/OR ACTIVATION

(75) Inventors: Manfred Bartz, Snohomish, WA (US); Marat Zhaksilikov, Snohomish, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 538 days.

(21) Appl. No.: 10/010,591

(22) Filed: Nov. 9, 2001

(51) Int. Cl.
*G09G 5/00* (2006.01)

(52) U.S. Cl. .................. 715/821; 715/709; 715/779

(58) Field of Classification Search ............. 715/821, 715/779, 822, 817, 705–713, 853–855, 835–840
See application file for complete search history.

(56) References Cited

U.S. PATENT DOCUMENTS

| | | | | |
|---|---|---|---|---|
| 5,506,952 A | * | 4/1996 | Choy et al. .................. | 715/763 |
| 5,588,104 A | * | 12/1996 | Lanier et al. ............... | 345/848 |
| 5,905,496 A | * | 5/1999 | Lau et al. .................... | 345/835 |
| 6,014,135 A | * | 1/2000 | Fernandes ................... | 345/744 |
| 6,121,965 A | * | 9/2000 | Kenney et al. ............. | 345/810 |
| 6,225,998 B1 | * | 5/2001 | Okita et al. ................. | 345/853 |
| 6,239,800 B1 | * | 5/2001 | Mayhew et al. ............ | 345/764 |
| 6,456,304 B1 | * | 9/2002 | Angiulo et al. ............. | 715/779 |
| 6,750,878 B1 | * | 6/2004 | Tatsuo et al. ............... | 715/705 |
| 6,959,421 B1 | * | 10/2005 | Bartz et al. ................. | 715/821 |

OTHER PUBLICATIONS

Microsoft Word 2000, Copy Right 1983-1999.*

* cited by examiner

*Primary Examiner*—Steven Sax
*Assistant Examiner*—Thanh Vu

(57) ABSTRACT

A method and system for helping a user perform tasks in software. Graphic elements (e.g., icons) are rendered and displayed regardless of which task is being performed. An element can be either active or inactive; user selection of an element with the element active initiates an action in response to the selection while user selection of the element with the element inactive will not initiate the action. The elements are selectively activated and deactivated to guide the user through the tasks according to the order in which the tasks are logically performed. The elements are also selectively activated and deactivated to suggest a hierarchy to the tasks within the logical order of the tasks. Accordingly, the user is guided through the tasks without the need for a help utility such as a wizard.

34 Claims, 11 Drawing Sheets

700

MULTI-LEVEL QUICK CLICK ICON HIERARCHY AND/OR ACTIVATION

TECHNICAL FIELD

The present invention generally relates to software applications. Specifically, the present invention relates to a help utility within an application, in particular an application used for designing a microcontroller.

BACKGROUND ART

Microcontrollers function to replace mechanical and electromechanical components in a variety of applications and devices. Since they were first introduced approximately 30 years ago, microcontrollers have evolved to the point where they can be used for increasingly complex applications. Some microcontrollers in use today are also programmable, expanding the number of applications in which they can be used.

However, even though there are a large number of different types of microcontrollers available on the market with a seemingly wide range of applicability, it is still often difficult for a designer to find a microcontroller that is particularly suited for a particular application. Unique aspects of the intended application may make it difficult to find an optimum microcontroller, perhaps necessitating a compromise between the convenience of using an existing microcontroller design and less than optimum performance.

In those cases in which a suitable microcontroller is found, subsequent changes to the application and new requirements placed on the application will likely affect the choice of microcontroller. The designer thus again faces the challenge of finding a suitable microcontroller for the intended application.

To overcome these problems, microcontroller suppliers (specifically, Cypress MicroSystems in Bothell, Wash.) have started to offer standard parts that combine a microprocessor with several user-configurable "building blocks." These building blocks may be assembled, configured and programmed to form many standard microprocessor peripherals, as well as to form unique peripherals as may be required by a specific application. Thus, a user can tailor a microcontroller to meet his or her specific requirements, in less time and at less cost than through other means. A microcontroller assembled from these building blocks is referred to herein as a programmable single-chip system. Additional information regarding such a microcontroller is provided in the co-pending, commonly-owned U.S. patent application Ser. No. 10/033,027, filed Oct. 22, 2001, by W. Snyder, and entitled "Programmable Microcontroller Architecture," hereby incorporated by reference.

Unfortunately, conventional tools available for designing, configuring and programming these and other types of microcontrollers are confusing and difficult to use. The conventional tools are generally categorized as one of two types: a "wizard" type, and a "free form" type. Each of these types has its own set of problems.

In a wizard type of approach, the user is guided through the design process, from one step to the next step. Typically, the user is presented with a standardized display screen or window. The user fills in the required fields, then advances to the next screen when the required fields are completed.

One problem with the wizard type of approach is its rigidity. The user typically cannot advance to the next step without completing the existing step. Thus, for example, the effect of a decision made at one step cannot be seen on subsequent steps.

Another problem with the wizard type of approach is that the user can only move back and forth one step at a time. The user may make a decision at one step, proceed a number of steps forward in the process, then decide to review or change the decision made several steps earlier. The only way to return to the earlier step is to traverse through each of the windows for all of the intervening steps.

The free form type of approach is substantially less rigid than the wizard approach, but as a result it is confusing and difficult to use. In a free form approach, as a user designs and programs a microcontroller, choices of functions or tasks are presented as drop-down menus. Each function opens a different window, and multiple functions may need to be performed in order to complete even the most simple of tasks. Consequently, many windows are opened as the user attempts to design and program the microcontroller. The many displayed windows tend to be confusing because the user needs to keep track of which windows are used for which function. Also, the user needs to remember what information has been entered into each window, and what information is still required for each window. Furthermore, it is often difficult for the user to navigate between windows because some windows may be totally obscured by other windows. In addition, while the wizard approach helps a user that may not understand the design process and thus needs to be guided through that process in step-by-step fashion, the free form approach relies heavily on the familiarity of the user with the design process and so provides little or no guidance.

Thus, what is needed is a method or system that can help guide a user through a series of tasks in an orderly manner while facilitating movement between tasks. What is also needed is a method or system that can satisfy the above need and that can be used for the design of microcontrollers, such as microcontrollers of the design mentioned above. The present invention provides a novel solution to these needs.

DISCLOSURE OF THE INVENTION

The present invention provides a method and system thereof that can help guide a user through a series of tasks in an orderly manner while facilitating movement between tasks. The present invention further provides a method and system that can be used for the design of microcontrollers.

The present invention pertains to a method and system for helping a user perform tasks in software. In one embodiment, the tasks to be performed are those associated with the design of a microcontroller, such as a microcontroller utilizing a programmable system on a chip architecture.

In one embodiment, graphic elements (e.g., icons) are rendered and displayed regardless of which task is being performed; that is, the elements are always visible. In the various embodiments of the present invention, each element is associated with a particular task, task window, or "workspace" (a workspace may be associated with one or more tasks and may consist of one or more task windows). In one embodiment, the graphic elements are displayed in an order that corresponds to the order in which the tasks should be logically performed.

A graphic element can be either active or inactive; user selection of an element with the element active initiates an action in response to the selection while user selection of the element with the element inactive will not initiate the action. In the various embodiments of the present invention, when a user selects an active element (e.g., the user "clicks" on an icon in the familiar fashion), the associated task window or workspace is opened (displayed).

In accordance with the present invention, some elements are activated and other elements are deactivated according to the task to be performed or the window or workspace to be used. In one embodiment, one or more elements are activated at all times. In another embodiment, in response to the user selecting a graphic element (the user also thereby selecting a particular task, window or workspace), one or more different elements are activated while other elements are deactivated, thus providing the user with access to certain tasks, windows or workspaces while preventing access to others. What a user can and cannot access is intelligently selected and enforced by activating and deactivating elements, thereby guiding the user through the tasks according to the order in which the tasks should be logically performed.

In one embodiment of the present invention, a first plurality of graphic elements and a second plurality of graphic elements are rendered in a first toolbar and a second toolbar, respectively. In this embodiment, a first portion of the first plurality of elements is activated in response to user selection of another element, in particular an element from the first plurality of elements. A second portion of the second plurality of elements is activated in response to an element from the first plurality of elements, in particular an element from the first portion of elements. In this manner, graphic elements are selectively activated and deactivated to suggest a hierarchy of tasks within the logical order of the tasks.

According to another embodiment of the present invention, a graphic element associated with a first task and a graphic element associated with a second task can be active at the same time. By selecting one element or the other, the user can move directly between the windows (or workspaces) for the first and second tasks without passing through the windows or workspaces of any intervening tasks.

In summary, the present invention is used to suggest an order for performing tasks, guiding the user through the tasks and facilitating user movement between tasks without the need for a help utility such as a wizard. The user is guided through the tasks in an organized manner, while still providing the user with a degree of flexibility and freedom of movement. These and other objects and advantages of the present invention will become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
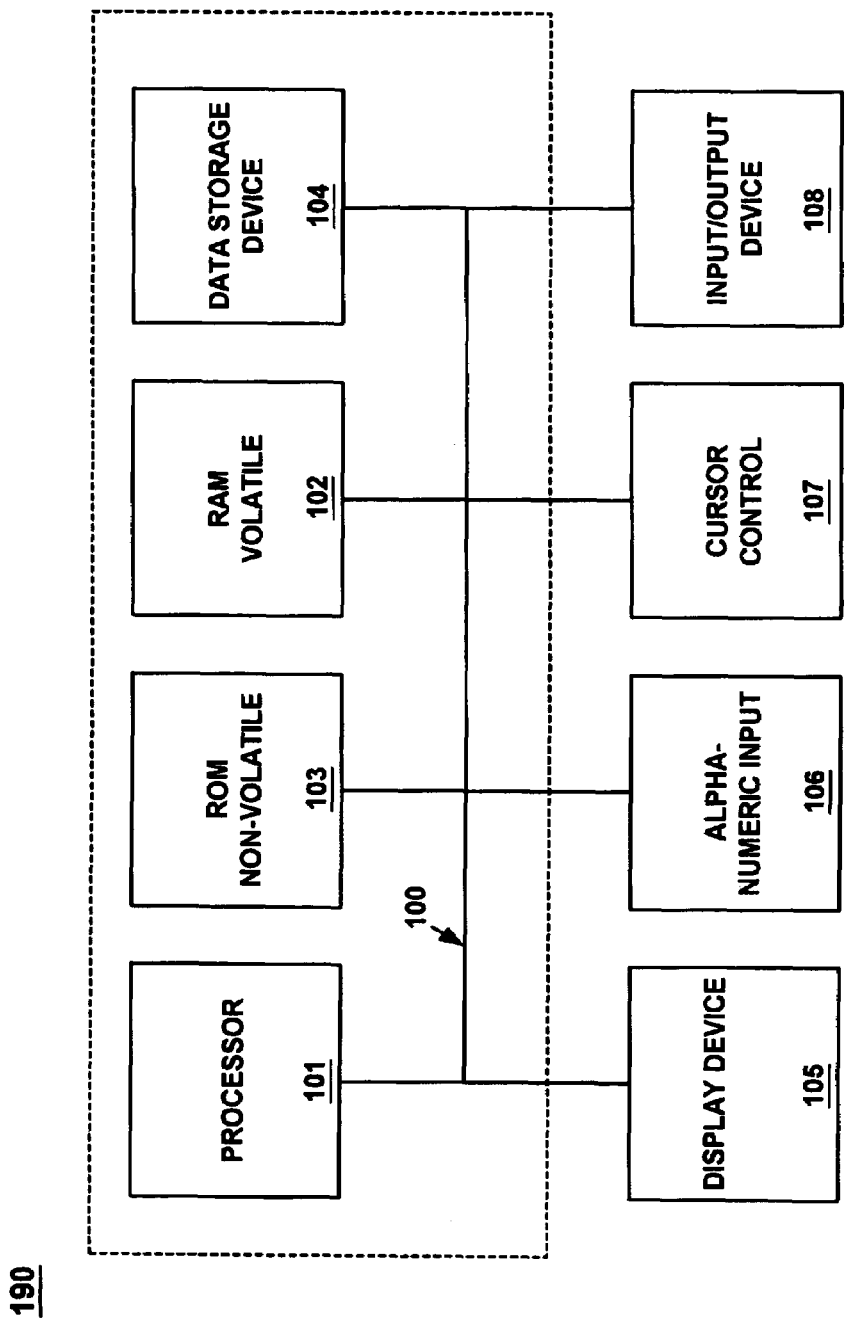
FIG. 1 is a block diagram of an exemplary computer system upon which embodiments of the present invention may be practiced.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "rendering," "activating," "deactivating," "displaying," "accessing," "selecting," "generating," "placing," "specifying," "programming," "executing" or the like, refer to actions and processes (e.g., processes 300, 500 and 600 of FIGS. 3, 5 and 6, respectively) of a computer system or similar electronic computing device. The computer system or similar electronic computing device manipulates and transforms data represented as physical (electronic) quantities within the computer system memories, registers or other such information storage, transmission or display devices. The present invention is well suited to use with other computer systems.

Refer now to FIG. 1, which illustrates an exemplary computer system 190 upon which embodiments of the present invention may be practiced. In general, computer system 190 comprises bus 100 for communicating information, processor 101 coupled with bus 100 for processing information and instructions, random access (volatile) memory (RAM) 102 coupled with bus 100 for storing information and instructions for processor 101, read-only (non-volatile) memory (ROM) 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, an optional input/output (I/O) device 108 is used to couple computer system 190 onto, for example, a network.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

The present invention is described in the context of a software tool, portions of which are comprised of computer-readable and computer-executable instructions which reside, for example, in computer-usable media of a computer system such as that exemplified by FIG. 1. The present invention is primarily described as being used with a tool for designing, configuring, programming, compiling, building (assembling), emulating, and debugging an embedded microcontroller, in particular a class of microcontrollers that provide analog and/or digital subsystems comprising many dynamically configurable blocks. An example of this class is referred to herein as a programmable microcontroller architecture. Additional information regarding such an architecture is provided in the co-pending, commonly-owned U.S. patent application Ser. No. 10/033,027, filed Oct. 22, 2001, by W. Snyder, and entitled "Programmable Microcontroller Architecture," hereby incorporated by reference.

Figure 2A:
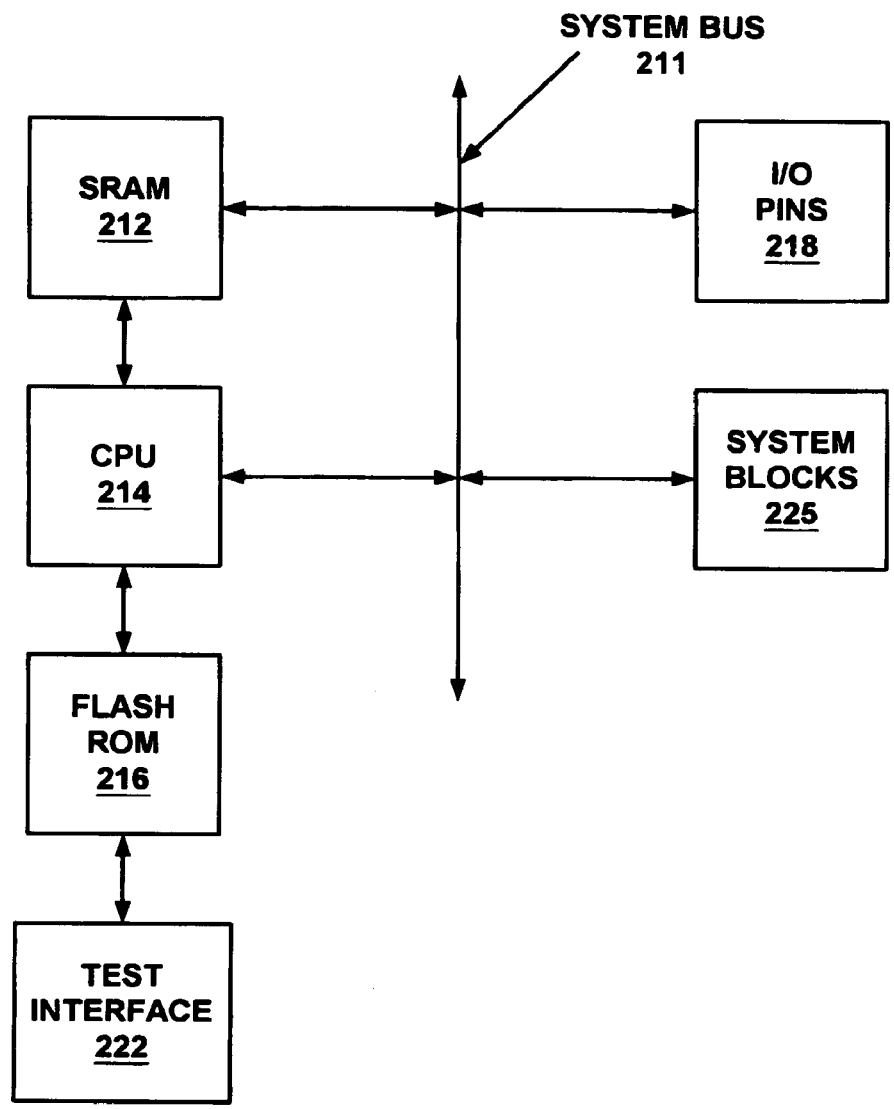
FIG. 2A is a block diagram of an exemplary programmable single-chip system architecture used with one embodiment of the present invention.

FIG. 2A is a block diagram of an integrated circuit (or microcontroller) 210 that exemplifies a microcontroller which uses a programmable architecture. In the illustrated embodiment, integrated circuit 210 includes a system bus 211, and coupled to bus 211 are synchronous random access memory (SRAM) 212 for storing volatile or temporary data during firmware execution, central processing unit (CPU) 214 for processing information and instructions, flash read-only memory (ROM) 216 for holding instructions (e.g., firmware), input/output (I/O) pins 218 providing an interface with external devices and the like, and system blocks 225. The system blocks 225 include analog blocks and digital blocks.

Figure 2B:
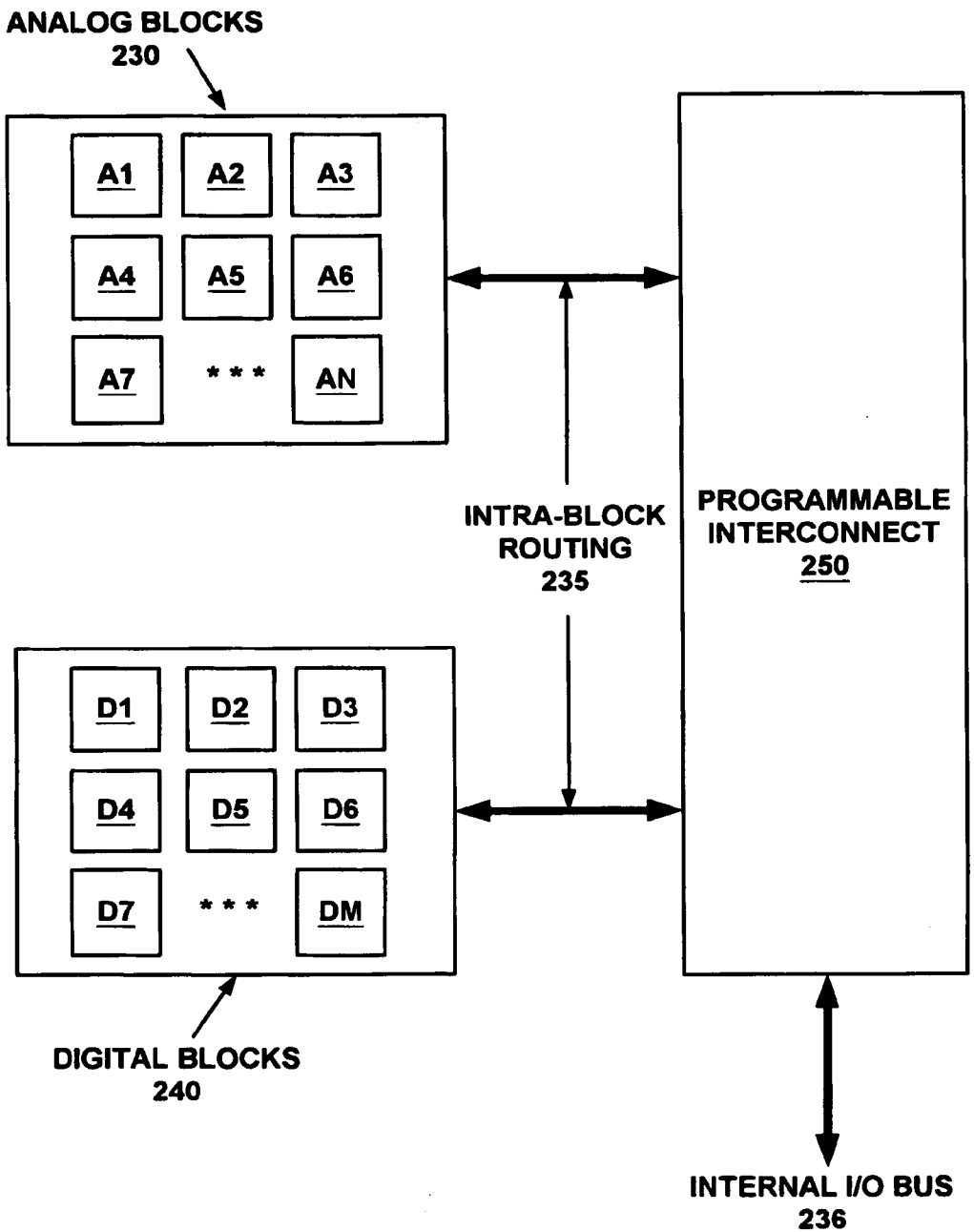
FIG. 2B is a block diagram of an exemplary arrangement of programmable system blocks used with one embodiment of the present invention.

Referring to FIG. 2B, an embodiment of system block 225 is depicted in greater detail. In this embodiment, system block 225 includes an analog functional block 230, a digital functional block 240, and a programmable interconnect 250. Analog block 230 includes, in the present embodiment, a matrix of interconnected analog blocks A1 through AN. The number N may be any number of analog blocks. Likewise, digital block 240 includes, in the present embodiment, a matrix of interconnected digital blocks D1 through DM. The number M may be any number of digital blocks. The analog blocks A1 through AN and the digital blocks D1 through DM are fundamental building blocks that may be combined in different ways to accomplish different functions. Importantly, different combinations of blocks, producing different functions, may exist at different times within the same system. For example, a set of blocks configured to perform the function of analog-to-digital conversion may sample a signal. After processing that signal in the digital domain, those same blocks (perhaps in conjunction with a few others) may be recombined in a different configuration to perform the function of digital-to-analog conversion to produce an output signal.

Continuing with reference to FIG. 2B, the internal matrices of analog blocks 230 and digital blocks 240 may be constituted, in one embodiment, by a routing matrix described further in the patent application referenced above. Analog blocks 230 and digital blocks 240 are electrically and/or communicatively coupled to programmable interconnect 250, in the present embodiment, by intra-block routing 235. Each individual functional unit, e.g., analog blocks A1 through AN and digital blocks D1 through DM, may communicate and interact with each and/or any other functional unit. Which functional unit communicates with which other functional unit is programmable, in the present embodiment, via the configurability of the programmable interconnect 250. The programmable interconnect 250 is connected via an internal input/output (I/O) bus 236 to pin-by-pin configurable I/O transceivers (pins) 218 (FIG. 2A), which effect communicative coupling between integrated circuit 210 (FIG. 2A) and external modalities. The total pin count of pin-by-pin configurable I/O pins 218 may vary from one application to another, depending on the system device under consideration.

Figure 3:
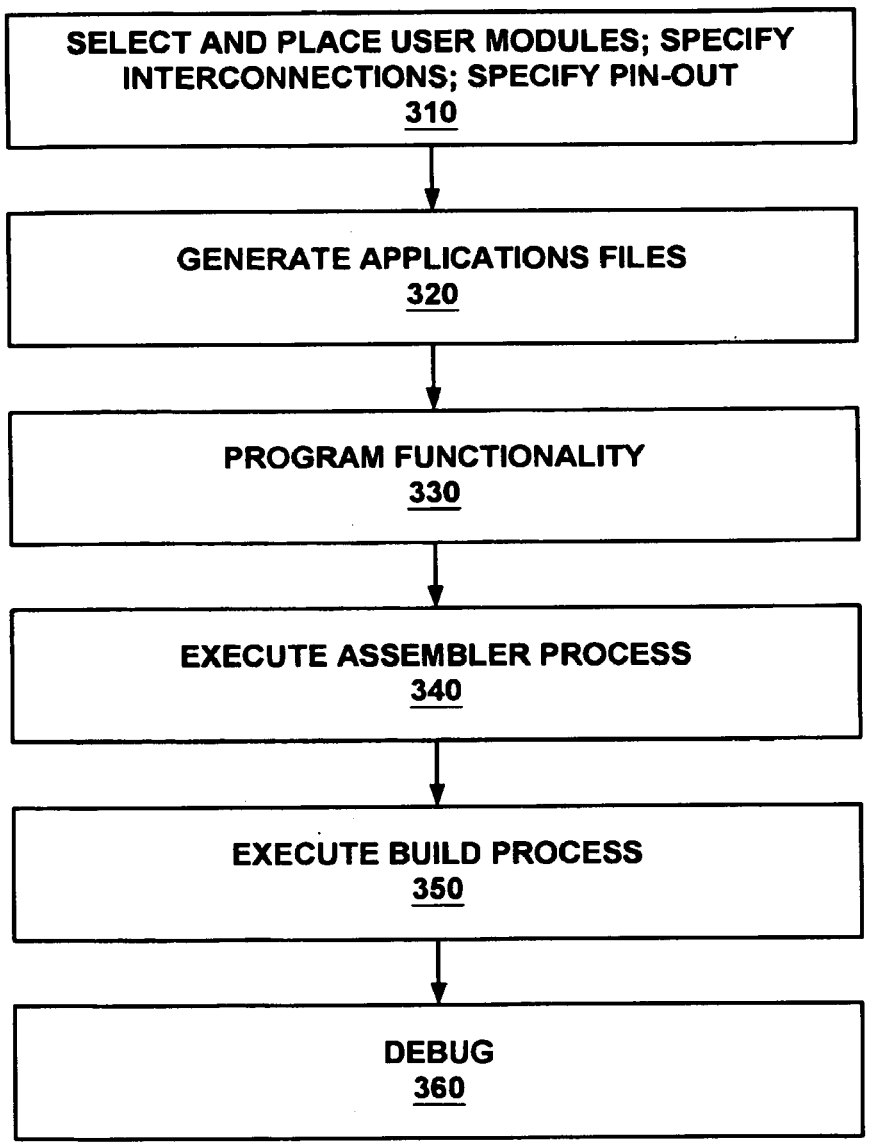
FIG. 3 is a flowchart of a process used by a microcontroller design tool in accordance with one embodiment of the present invention.

With reference next to FIG. 3, process 300 illustrates exemplary steps used by a microcontroller design tool in accordance with one embodiment of the present invention. The purpose of process 300 is to configure, program, compile, build, emulate and debug a customized microcontroller (a "target device") based on the integrated circuit 210 and system blocks 225 of FIGS. 2A and 2B.

In one embodiment, process 300 of FIG. 3 is carried out by a processor under the control of computer-readable and computer-executable instructions. The computer-readable and computer-executable instructions reside, for example, in data storage features such as computer usable volatile memory 102, computer-usable non-volatile memory 103, and/or data storage device 104 of FIG. 1. The computer-readable and computer-executable instructions are used to control or operate in conjunction with, for example, central processing unit 101 of FIG. 1.

Although specific steps are disclosed in process 300 of FIG. 3, such steps are exemplary. That is, the present invention is well suited to use with various other steps or variations of the steps recited in process 300. Additionally, for purposes of clarity and brevity, the following discussion and examples specifically deal with a microcontroller design tool. The present invention, however, is not limited solely to use with a microcontroller design tool. Instead, the present invention is well suited to use with other types of computer-aided hardware and software design systems in which it is necessary to accomplish a multitude of tasks as part of an overall process.

In step 310, applicable "user modules" are selected. A user module, as used herein, is a preconfigured function that may be based on more than one system block. A user module, once placed and programmed, will work as a peripheral on the target device. At any time in process 300, user modules may be added to or removed from the target device.

The selected user modules can then be "placed" or "mapped" onto the system blocks 225 of FIG. 2B. Once a user module is placed, its parameters can be viewed and modified as needed. Global parameters used by all of the user modules (for example, CPU clock speed) can also be set.

Continuing with step 310 of FIG. 3, interconnections between the selected user modules can be specified, either as each user module is placed or afterwards. The pin-out for each programmable system block can be specified, making a connection between the software configuration and the hardware of the target device.

In step 320, application files can be generated. When application files are generated, existing assembly-source and C compiler code are updated for all device configurations, and application program interfaces (APIs) and interrupt service routines (ISRs) are generated.

In step 330, the desired functionality can be programmed into the target device. Source code files can be edited, added or removed.

In step 340, the assembler process can be executed. The assembler operates on an assembly-language source to produce executable code. This code is compiled and built into an executable file that can be downloaded into an emulator, where the functionality of the target device can be emulated and debugged.

In step 350, the target device can be "built." Building the target device links all the programmed functionalities of the source files (including device configuration), which are downloaded to a file for debugging.

In step 360, the target device can be emulated using an in-circuit emulator for debugging. The emulator allows the target device to be tested in a hardware environment while device activity is viewed and debugged in a software environment.

FIGS. 4A, 4B, 4C and 4D illustrate exemplary graphical user interfaces (GUIs) that are generated in accordance with one embodiment of the present invention. In one embodiment, these GUIs are displayed on display device 105 of computer system 190 (FIG. 1). It is appreciated that these GUIs are exemplary only, and that they may include different numbers and shapes of elements and windows other than those which are illustrated.

Figure 4A:
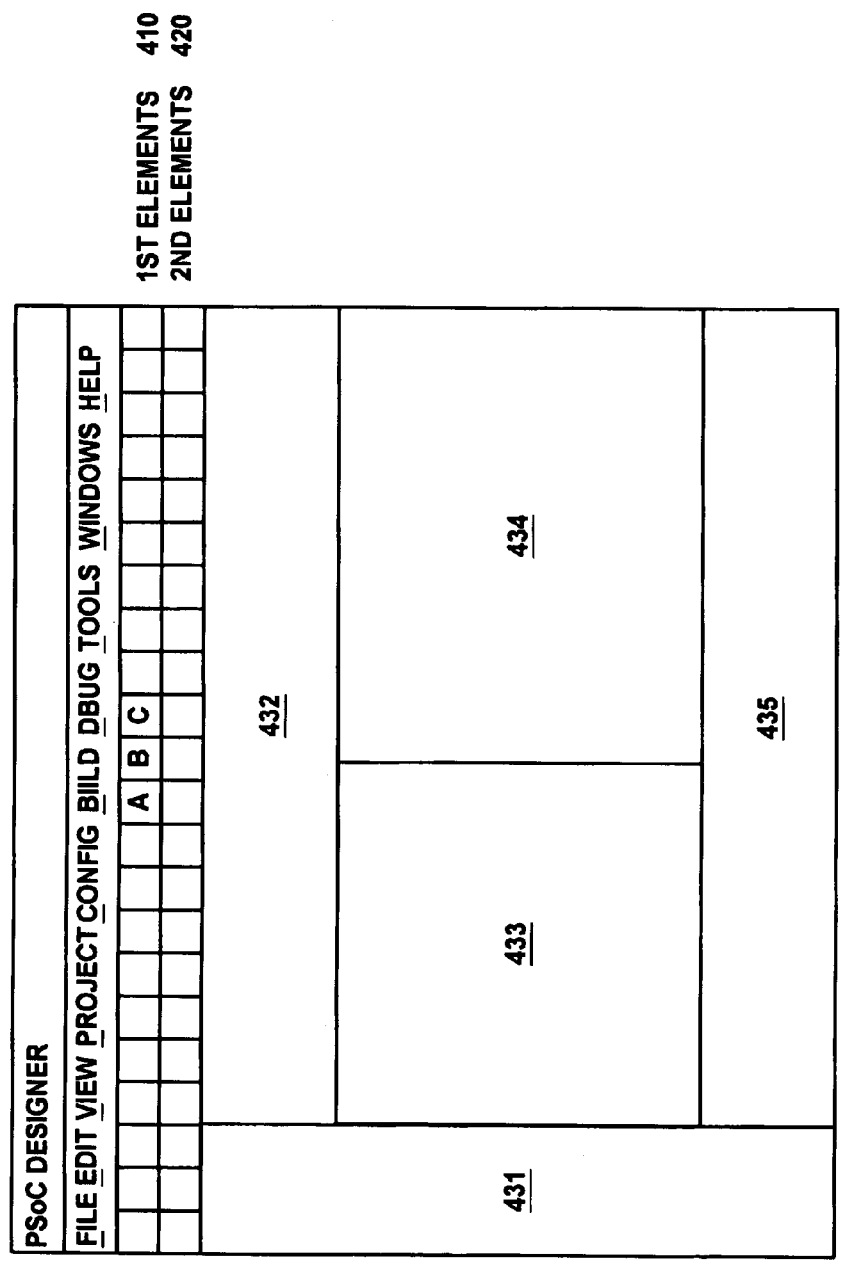
FIGS. 4A, 4B, 4C and 4D illustrate exemplary graphical user interfaces that are generated in accordance with one embodiment of the present invention.

FIG. 4A shows a GUI 400 comprising a first plurality of graphic elements 410, a second plurality of graphic elements 420, and a number of open windows 431, 432, 433, 434 and 435. In one embodiment, the first and second pluralities of graphic elements are icons rendered as buttons. In another embodiment, the first plurality of graphic elements 410 are organized in a first toolbar, and the second plurality of graphic elements 420 are organized in a second toolbar. In the present embodiment, each graphic element is associated with a particular task, window or workspace. As will be seen, the graphic elements are organized within each toolbar to suggest an order for performing tasks, and the first and second toolbars are used to suggest a hierarchy of tasks.

In accordance with the present invention, each of the graphic elements may be either active or inactive. An active element, when selected by a user, will initiate an action. An inactive element will not initiate an action if selected by a user. In one embodiment, active elements are rendered in color, while inactive elements are rendered in gray tones; in general, elements are rendered in a way that makes them readily distinguishable as being either active or inactive. In FIG. 4A, the active elements are labeled A, B and C, while the inactive elements are not labeled. In the present embodiment, the graphic elements are always visible, regardless of which task is being performed (or which window or workspace is open), and regardless of whether the element is active or inactive.

Elements are selected by a user in a conventional manner. That is, for example, a user can position a cursor over an element and "click" a cursor control element (e.g., a mouse) to select an element. When the elements are rendered as buttons, a selected element is depicted so that it appears to be depressed. In general, a selected element is rendered in a way that allows the user to readily determine which element has been selected.

In the present embodiment, user selection of an active element initiates a particular task. One or more of the windows 431–435 may be associated with the particular task. The windows associated with a particular task can be referred to as a workspace. Thus, selection of an active element can not only initiate a task, but can also provide the user with access to a window or windows or a particular workspace. By extension, initiating a task is equivalent to opening a window or presenting a workspace. As depicted in FIG. 4A, one of the elements A, B and C has been selected (say element A), resulting in the presentation of a workspace comprising windows 431–435. Selection of another element may result in different windows or workspaces being opened.

In the present embodiment, some of the elements are always active, regardless of which task is being performed (or which window or workspace is open). As depicted in FIG. 4A, the three elements A, B and C are active at all times, and the other elements are not active. For example, the microcontroller design tool described in conjunction with FIG. 3 is, in one embodiment, divided into at least three subsystems: a Device Editor subsystem, an Application Editor subsystem, and a Debugger subsystem. In essence, the Device Editor subsystem implements steps 310–320 of FIG. 3, the Application Editor subsystem implements steps 330–340 of FIG. 3, and the Debugger subsystem implements step 360 of FIG. 3. According to the present invention, an element is associated with each of these subsystems, and the element for each subsystem is always active, regardless of which subsystem is being used for the task at hand. Thus, a user can readily move between various tasks (or windows or workspaces) by selecting the appropriate active element. For example, in the microcontroller design tool, the user can move from the Debugger subsystem back to the Device Editor subsystem without having to pass through the Application Editor subsystem.

Another feature of the present invention is that the graphic elements are rendered in GUI 400 in locations that correspond to the logical order in which tasks should be performed. For example, as described above, in the microcontroller design tool, the Device Editor subsystem implements steps 310–320 of FIG. 3, the Application Editor subsystem implements steps 330–340 of FIG. 3, and the Debugger subsystem implements step 360 of FIG. 3. In accordance with the present invention, element A is associated with the Device Editor subsystem, element B with the Application Editor subsystem, and element C with the Debugger subsystem. The order of the graphic elements is used to suggest to the user the order in which the subsystems are to be accessed.

Figure 4B:
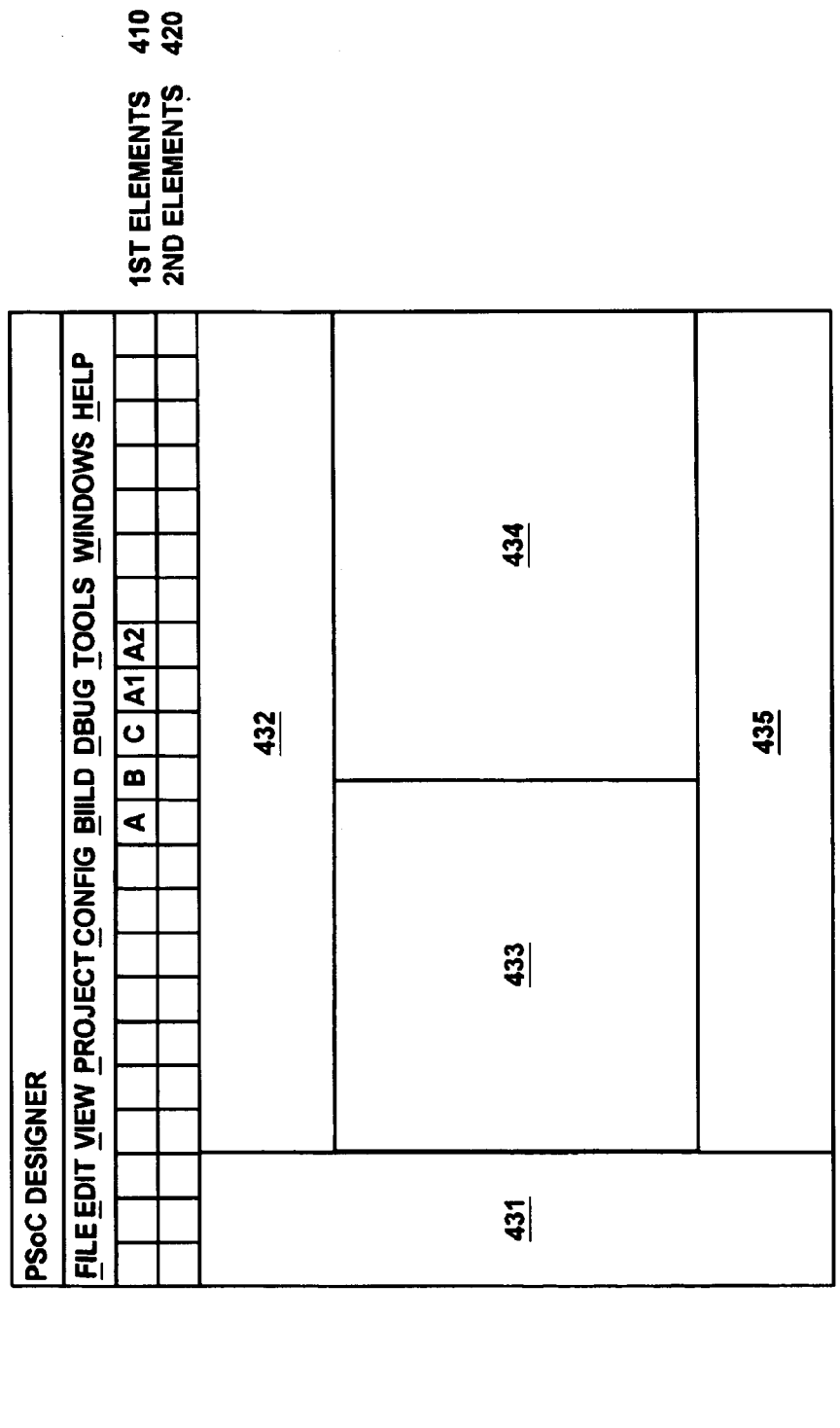

FIG. 4B shows an example GUI 401 similar to that of GUI 400 of FIG. 4A; however, in FIG. 4B, the elements A1 and A2 have been activated. In the present embodiment, elements A1 and A2 are activated in response to user selection of another element (e.g., element A). It is understood that certain elements can also be deactivated in response to user selection of a particular element.

FIG. 4B is described further by way of example. In the microcontroller design tool, a user can select a user module and place it using the Device Editor subsystem (refer to step 310 of FIG. 3). To accomplish this, the user selects element A (for example) to implement the Device Editor subsystem. In response to this selection, elements for the user module selection task and for the user module placement task (e.g., elements A1 and A2) are activated. Other elements may also be activated for the other tasks that can be performed using the Device Editor subsystem.

Thus, similar to that described above, elements are presented to the user in such a way so as to guide the user through the tasks in a logical order; for example, the user module selection task and the user module placement task are not activated until the user implements the Device Editor subsystem. As well, the elements are placed to suggest to the user a logical order for performing the tasks. That is, for example, the elements for the user module selection task and for the user module placement task are proximate to each other, implying a relationship between the tasks. Also, the element for the user module selection task is placed to the left of the element for the user module placement task, implying an order in which the tasks should be performed.

Figure 4C:
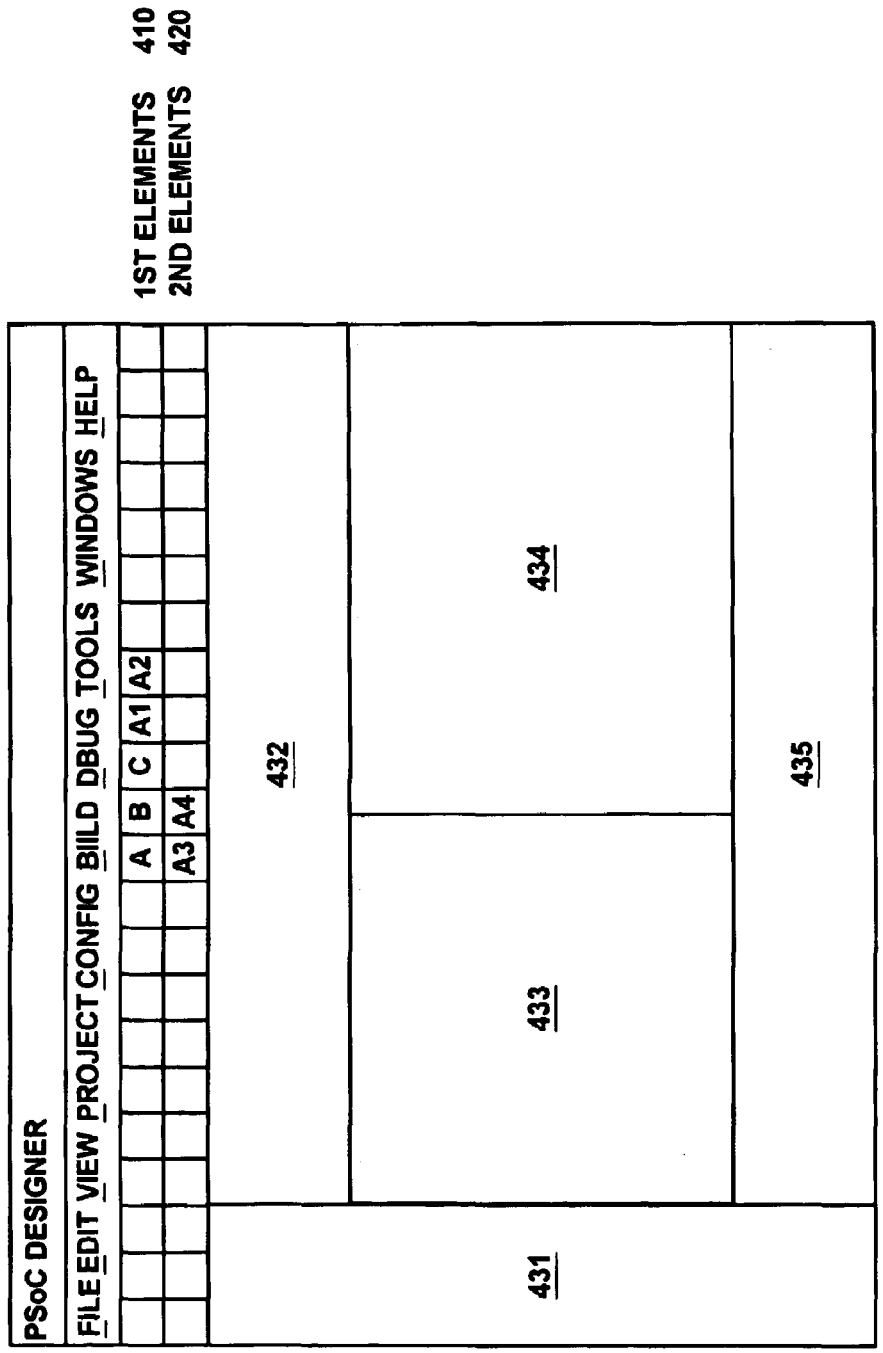

FIG. 4C illustrates an example GUI 402 in which elements A3 and A4 have been activated. In one embodiment, elements A3 and A4 are activated in response to user selection of element A. In another embodiment, elements A3 and A4 are activated in response to user selection of, for example, element A1. Thus, and in particular in the latter case, the elements can be used to imply a hierarchy of tasks within the logical order of tasks. The implication of a hierarchy of tasks is further enforced by activating elements on the second (lower) toolbar, implying that tasks associated with elements on the second toolbar (e.g., second elements 420) are subtasks of larger tasks associated with elements on the first toolbar (e.g., first elements 410). Again, the position and order in which the elements appear also implies that a relationship exists between the elements. For example, elements A3 and A4 can be observed to be associated with subtasks of a task associated with element A, element A3 can be observed to be associated with element A4, and the task associated with element A3 can be observed as likely occurring before the task associated with element A4.

Also of significance, elements A3 and A4 are not activated until, for example, element A1 is selected. In this case, a user could not initiate an action associated with elements A3 and A4 unless the user has also initiated the action associated with element A1. In other words, the user is provided with access to only certain tasks, windows or workspaces and is prevented from accessing others, depending on which element the user has selected. According to the present invention, what a user can and cannot access is intelligently selected and enforced by activating and deactivating certain elements (e.g., A3 and A4) in response to user selection of a particular element (e.g., A1). In this manner, the user is guided through the tasks in the order in which the tasks should be logically performed.

Figure 4D:
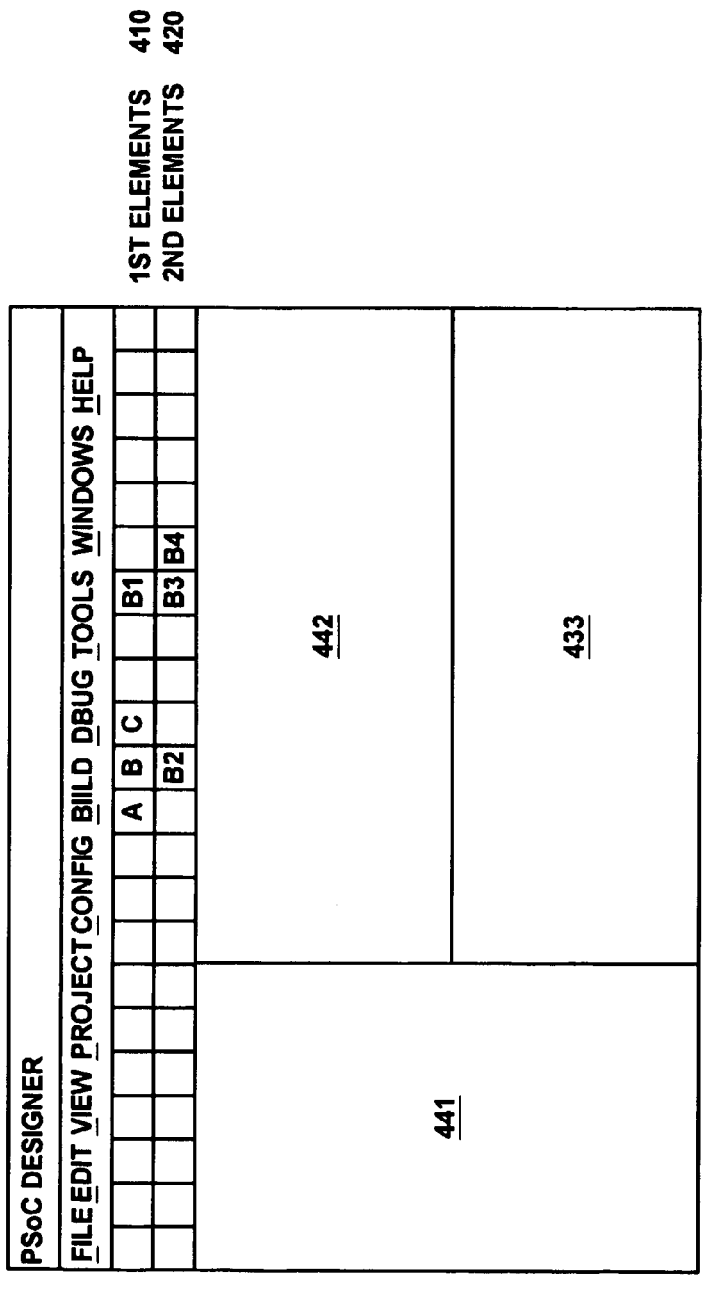

FIG. 4D illustrates an example GUI 403 in which elements A1–A4 have been deactivated and elements B1, B2, B3 and B4 have been activated. Elements B1–B4 may be activated, and elements A1–A4 deactivated, in response to user selection of element B or, in a manner similar to that described above, any of the elements B1–B4 may be activated in response to user selection of any of the other elements B1–B4. As described previously herein, the elements B1–B4 are selectively activated (and the elements A1–A4 selectively deactivated) to guide the user through the tasks in a process in a logical order, and the order and position of the elements are chosen to provide additional guidance to the user. It is also observed that user selection of element B opens a new workspace comprising windows 441, 442 and 443.

It is appreciated that, in response to user selection of element B, not all of the elements A1–A4 may be deactivated. For example, element A1 may remain active. In this manner, a shortcut is created between tasks. For instance, in the microcontroller design tool in which element A is associated with the Device Editor subsystem and element B is associated with the Application Editor subsystem, a user may move from a task in the Application Editor subsystem directly to a task in the Device Editor subsystem without traversing through all of the intervening tasks. For example, the user can move directly between a task associated with any of the elements B1–B4 to the task associated with element A1, and vice versa. Thus, the user does not have to leave a task in the Application Editor subsystem, enter the Device Editor subsystem, next enter a specific task within the Device Editor subsystem, and then reverse these steps to return to the task in the Application Editor subsystem; instead, the user moves directly to the task in the Device Editor subsystem, then directly back to the task in the Application Editor subsystem. However, the user is still presented with only a limited number of choices that are intelligently selected and enforced by activating and deactivating certain elements. Thus, as opposed to a conventional wizard approach, a user has greater flexibility and freedom of movement, but the user is still provided with a degree of organization and guidance, in contrast to a conventional free form approach.

Figure 5:
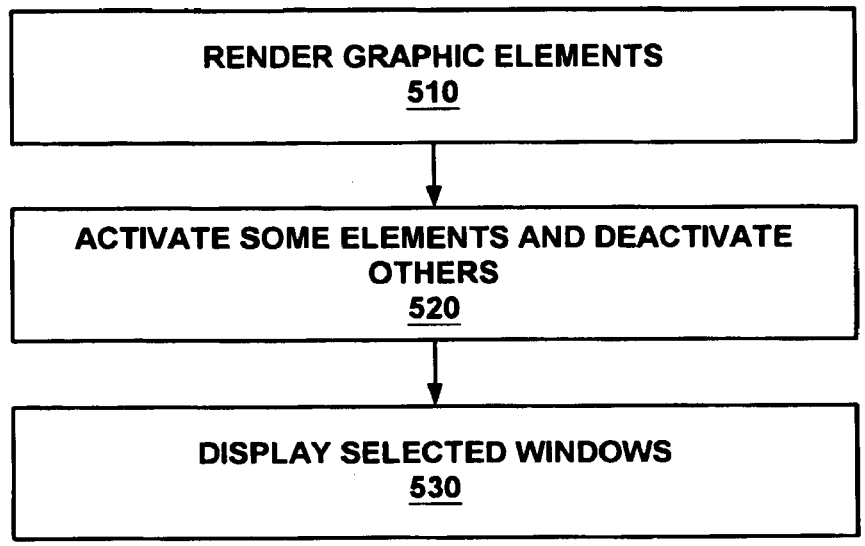
FIG. 5 is a flowchart of one embodiment of a process for helping a user perform tasks in software according to the present invention.
Figure 6:
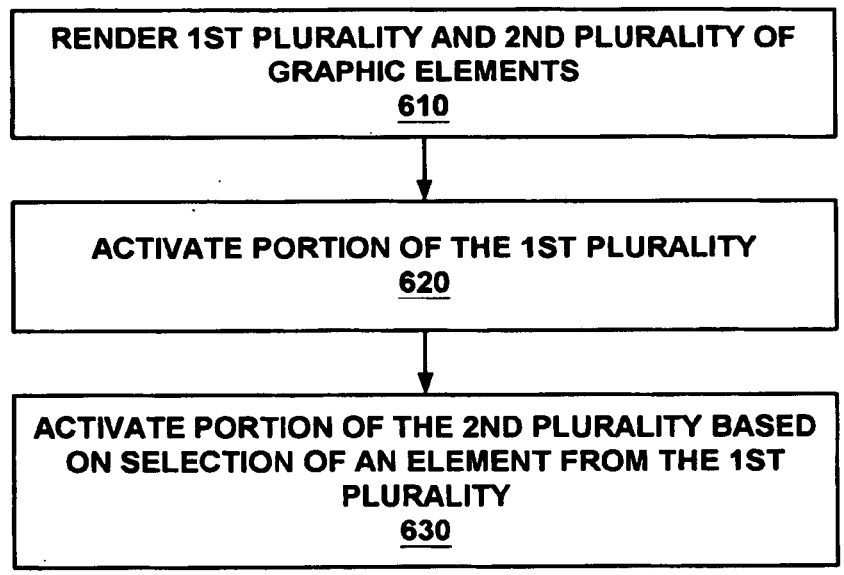
FIG. 6 is a flowchart of another embodiment of a process for helping a user perform tasks in software according to the present invention.

FIGS. 5 and 6 are a flowcharts of embodiments of processes 500 and 600, respectively, for helping a user perform tasks in software according to the present invention. In one embodiment, processes 500 and 600 are carried out by a processor under the control of computer-readable and computer-executable instructions. The computer-readable and computer-executable instructions reside, for example, in data storage features such as computer usable volatile memory 102, computer-usable non-volatile memory 103, and/or data storage device 104 of FIG. 1. The computer-readable and computer-executable instructions are used to control or operate in conjunction with, for example, central processing unit 101 of FIG. 1. Although specific steps are disclosed in processes 500 and 600, such steps are exemplary. That is, the present invention is well suited to use with various other steps or variations of the steps recited in processes 500 and 600.

With reference first to FIG. 5, in step 510, graphic elements are rendered in a GUI displayed on a display device of a computer system. In the present embodiment, the graphic elements are displayed at all times, whether the element is active or inactive.

In step 520, some of the graphic elements are selectively activated and other elements are selectively deactivated, depending on which task is being performed. The elements are activated and deactivated to suggest an order for performing the tasks, thereby guiding the user through the tasks in a logical order. In one embodiment, graphic elements are selectively activated and deactivated in response to user selection of another graphic element. In another embodiment, some of the graphic elements are activated at all times.

In step 530, in response to user selection of an element, an associated view is displayed; that is, a workspace comprising one or more windows may be opened.

Referring now to FIG. 6, in step 610, a first plurality of graphic elements and a second plurality of graphic elements are rendered in a GUI displayed on a display device of a computer system. In one embodiment, the first plurality of graphic elements is rendered in a first toolbar, and the second plurality of graphic elements is rendered in a second toolbar. In another embodiment, the first plurality of graphic elements includes elements that are active at all times.

In step 620, a portion of the first plurality of graphic elements is activated. In one embodiment, this portion of the graphic elements is activated in response to user selection of, in general, another graphic element and, specifically, another graphic element from the first plurality of graphic elements.

In step 630, in the present embodiment, a portion of the second plurality of graphic elements is activated in response to user selection of a graphic element from the first plurality of graphic elements, in particular the portion of elements activated in step 620. In this manner, graphic elements are selectively activated and deactivated not only to suggest an order for performing the tasks, but to suggest a hierarchy of the tasks within the logical order of the tasks.

In summary, the present invention presents graphic elements (e.g., icons) in the order of the overall process flow that a user should follow when performing the multitude of tasks that make up the process. Thereby, the icons guide the user through the process flow in a suggested order (e.g., left to right), according to a logical order of the tasks and a hierarchy of the tasks within the logical order. The icons are always present; some icons are always active, while other icons are selectively activated and deactivated. Selection of an icon initiates a task or opens a particular view (e.g., opens one or more windows that make up a workspace). The icons facilitate the movement of the user from one task, window or workspace to another.

Thus, the present invention provides a method and system that can help guide a user through a series of tasks in an orderly manner while facilitating movement between tasks. The present invention further provides a method and system that can be used for the design of microcontrollers. However, although described in the context of microcontroller design, it is appreciated that the present invention may be utilized in other types of computer-aided hardware and software design systems in which it is necessary to accomplish a multitude of tasks as part of an overall process; that is, the use of the present invention is not limited to use with the software design tool described herein.

Figure 7:
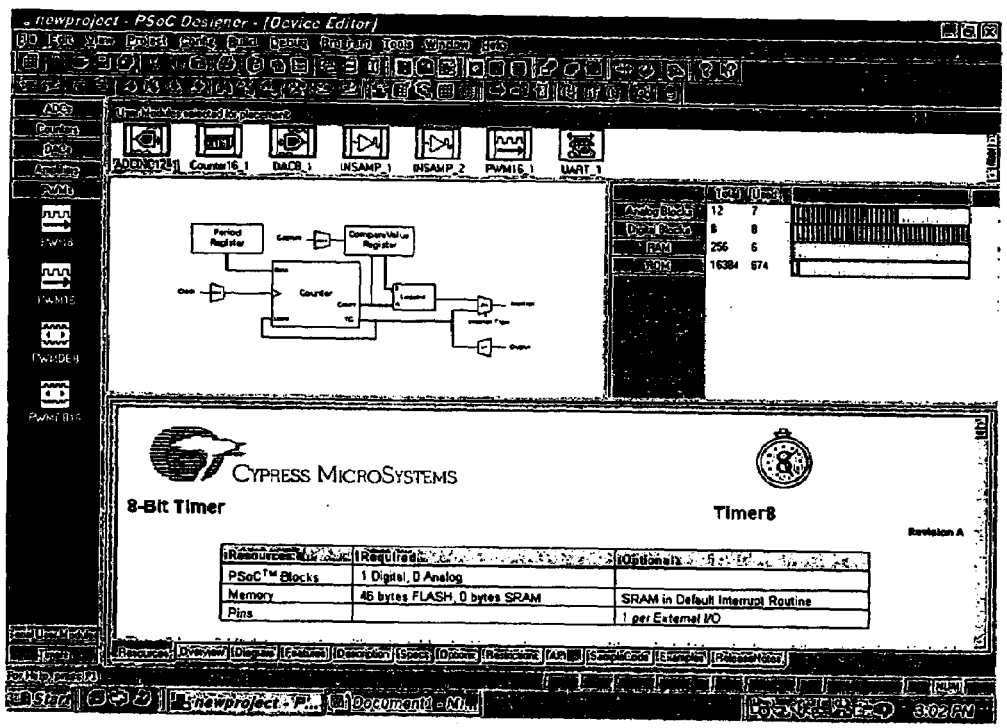
FIG. 7 illustrates an exemplary graphical user interface rendered according to one embodiment of the present invention.

FIG. 7 illustrates an exemplary graphical user interface 700 rendered according to one embodiment of the present invention. In particular, FIG. 7 shows a workspace for the Device Editor subsystem used by the microcontroller design tool described above. FIG. 7 shows two rows of icons, some of which are activated (those appearing in darker tones in the figure) and others of which are deactivated (those appearing in grayer tones in the figure). The icons are intelligently activated and deactivated as described above to guide the user through the various subsystems, tasks, windows and workspaces used by the microcontroller design tool.

The preferred embodiment of the present invention, multi-level quick click icon hierarchy and/or activation, is thus described. While the present invention has been described in particular embodiments, it should be appreciated that the present invention should not be construed as limited by such embodiments, but rather construed according to the following claims.

What is claimed is:

1. A method of helping a user perform tasks in software, said method comprising:

rendering a first plurality of graphic elements and a second plurality of graphic elements, wherein said first and second pluralities of graphic elements are visibly displayed at the same time regardless of which of said tasks is being performed and regardless of whether said first and second pluralities of graphic elements are active or inactive, wherein user selection of an element with said element active initiates an action in response to said selection while user selection of said element with said element inactive does not initiate an action;

making a first portion of said first plurality of graphic elements active; and making a second portion of said second plurality of graphic elements active in response to user selection of an element from said first plurality of graphic elements, wherein said tasks are to be performed in a logical order and wherein said second portion is selected according to said logical order, and wherein said first and second portions of active elements are displayed in an order corresponding to said logical order so that said active elements are presented to said user to guide said user through said tasks in said logical order.

2. The method of claim 1 wherein said first plurality of graphic elements comprises elements that are active regardless of which task is being performed.

3. The method of claim 1 wherein elements in said first portion are selectively activated to guide said user through said tasks according to said logical order.

4. The method of claim 1 wherein elements in said second portion are activated in response to user selection of an element from said first portion.

5. The method of claim 1 wherein said tasks comprise tasks for designing a microcontroller.

6. The method of claim 5 wherein said microcontroller is designed according to a programmable single-chip architecture.

7. The method of claim 1 wherein said first plurality of graphic elements comprises first icons organized in a first row and said second plurality of graphic elements comprises second icons organized in a second row adjacent to said first row, wherein said first icons and said second icons are arranged to indicate a hierarchy of said tasks within said logical order.

8. The method of claim 1 wherein selected windows are displayed in response to user selection of an element.

9. The method of claim 1 wherein a first element for a first task and a second element for a second task are active at the same time, wherein according to said logical order there are intervening tasks between said first and second tasks, and wherein movement between said first task and said second task is accomplished without movement through said intervening tasks in response to user selection of said first and second elements.

10. A computer system comprising:
   a bus;
   a display device coupled to said bus;
   a memory unit coupled to said bus; and
   a processor coupled to said bus, said processor for executing a method of helping a user perform tasks in software, said method comprising:
      rendering on said display device a first plurality of graphic elements and a second plurality of graphic elements, wherein said first and second pluralities of graphic elements are visibly displayed at the same time regardless of which of said tasks is being performed and regardless of whether said first and second pluralities of graphic elements are active or inactive, wherein user selection of an element with said element active initiates an action in response to said selection while user selection of said element with said element inactive does not initiate an action;
      making a first portion of said first plurality of graphic elements active; and
      making a second portion of said second plurality of graphic elements active in response to user selection of an element from said first plurality of graphic elements, wherein said tasks are to be performed in a logical order and wherein said second portion is selected according to said logical order, and wherein said first and second portions of active elements are displayed in an order corresponding to said logical order so that said active elements are presented to said user to guide said user through said tasks in said logical order.

11. The computer system of claim 10 wherein said first plurality of graphic elements comprises elements that are active regardless of which task is being performed.

12. The computer system of claim 10 wherein elements in said first portion are selectively activated to guide said user through said tasks according to said logical order.

13. The computer system of claim 10 wherein elements in said second portion are activated in response to user selection of an element from said first portion.

14. The computer system of claim 10 wherein said tasks comprise tasks for designing a microcontroller.

15. The computer system of claim 14 wherein said microcontroller is designed according to a programmable single-chip architecture.

16. The computer system of claim 10 wherein said first plurality of graphic elements comprises first icons organized in a first row and said second plurality of graphic elements comprises second icons organized in a second row adjacent to said first row, wherein said first icons and said second icons are arranged to indicate a hierarchy of said tasks within said logical order.

17. The computer system of claim 10 wherein selected windows are displayed in response to user selection of an element.

18. The computer system of claim 10 wherein a first element for a first task and a second element for a second task are active at the same time, wherein according to said logical order there are intervening tasks between said first and second tasks, and wherein movement between said first task and said second task is accomplished without movement through said intervening tasks in response to user selection of said first and second elements.

19. A computer-usable medium having computer-readable program code embodied therein for causing a computer system to perform a method of helping a user perform tasks in software, said method comprising:
   rendering a first plurality of graphic elements and a second plurality of graphic elements, wherein said first and second pluralities of graphic elements are visibly displayed at the same time regardless of which of said tasks is being performed and regardless of whether said first and second pluralities of graphic elements are active or inactive, wherein user selection of an element with said element active initiates an action in response to said selection while user selection of said element with said element inactive does not initiate an action;
   making a first portion of said first plurality of graphic elements active; and
   making a second portion of said second plurality of graphic elements active in response to user selection of an element from said first plurality of graphic elements, wherein said tasks are to be performed in a logical order and wherein said second portion is selected according to said logical order, and wherein said first and second portions of active elements are displayed in an order corresponding to said logical order so that said active elements are presented to said user to guide said user through said tasks in said logical order.

20. The computer-usable medium of claim 19 wherein said first plurality of graphic elements comprises elements that are active regardless of which task is being performed.

21. The computer-usable medium of claim 19 wherein elements in said first portion are selectively activated to guide said user through said tasks according to said logical order.

22. The computer-usable medium of claim 19 wherein elements in said second portion are activated in response to user selection of an element from said first portion.

23. The computer-usable medium of claim 19 wherein said tasks comprise tasks for designing a microcontroller.

24. The computer-usable medium of claim 23 wherein said microcontroller is designed according to a programmable single-chip architecture.

25. The computer-usable medium of claim 19 wherein said first plurality of graphic elements comprises first icons organized in a first row and said second plurality of graphic elements comprises second icons organized in a second row adjacent to said first row, wherein said first icons and said second icons are arranged to indicate a hierarchy of said tasks within said logical order.

26. The computer-usable medium of claim 19 wherein selected windows are displayed in response to user selection of an element.

27. The computer-usable medium of claim 19 wherein a first element for a first task and a second element for a second task are active at the same time, wherein according to said logical order there are intervening tasks between said first and second tasks, and wherein movement between said first task and said second task is accomplished without movement through said intervening tasks in response to user selection of said first and second elements.

28. A graphical user interface (GUI) for helping a user perform tasks in software, said GUI comprising:

a first plurality of graphic elements and a second plurality of graphic elements, wherein said first and second pluralities of graphic elements are visibly displayed at the same time regardless of which of said tasks is being performed and regardless of whether said first and second pluralities of graphic elements are active or inactive, wherein user selection of an element with said element active initiates an action in response to said selection while user selection of said element with said element inactive does not initiate an action;

wherein a first portion of said first plurality of graphic elements is active; and wherein a second portion of said second plurality of graphic elements is made active in response to user selection of an element from said first plurality of graphic elements, wherein said tasks are to be performed in a logical order and wherein said second portion is selected according to said logical order, and wherein said first and second portions of active elements are displayed in an order corresponding to said logical order so that said active elements are presented to said user to guide said user through said tasks in said logical order.

29. The GUI of claim 28 wherein said first plurality of graphic elements comprises elements that are active regardless of which task is being performed.

30. The GUI of claim 28 wherein elements in said first portion are selectively activated to guide said user through said tasks according to said logical order.

31. The GUI of claim 28 wherein said tasks comprise tasks for designing a microcontroller according to a programmable single-chip architecture.

32. The GUI of claim 28 wherein said first plurality of graphic elements comprises first icons organized in a first row and said second plurality of graphic elements comprises second icons organized in a second row adjacent to said first row, wherein said first icons and said second icons are arranged to indicate a hierarchy of said tasks within said logical order.

33. The GUI of claim 28 further comprising windows selectively displayed in response to user selection of an element.

34. The GUI of claim 28 wherein at least two graphic elements of said first portion of graphic elements are adjacent to each other, a first one of said two graphic elements corresponding to a first task and a second one of said two graphic elements corresponding to a second task, said first task preceding said second task according to said logical order.

* * * * *